UNITED STATES PATENT OFFICE.

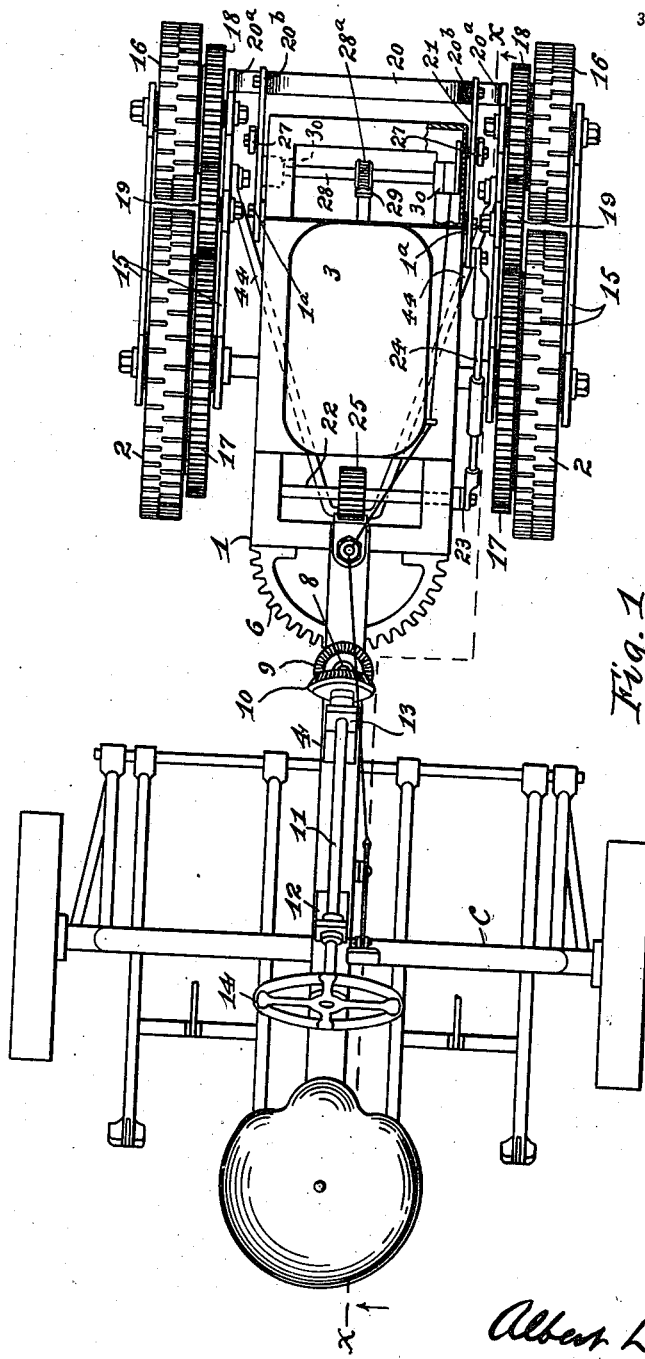

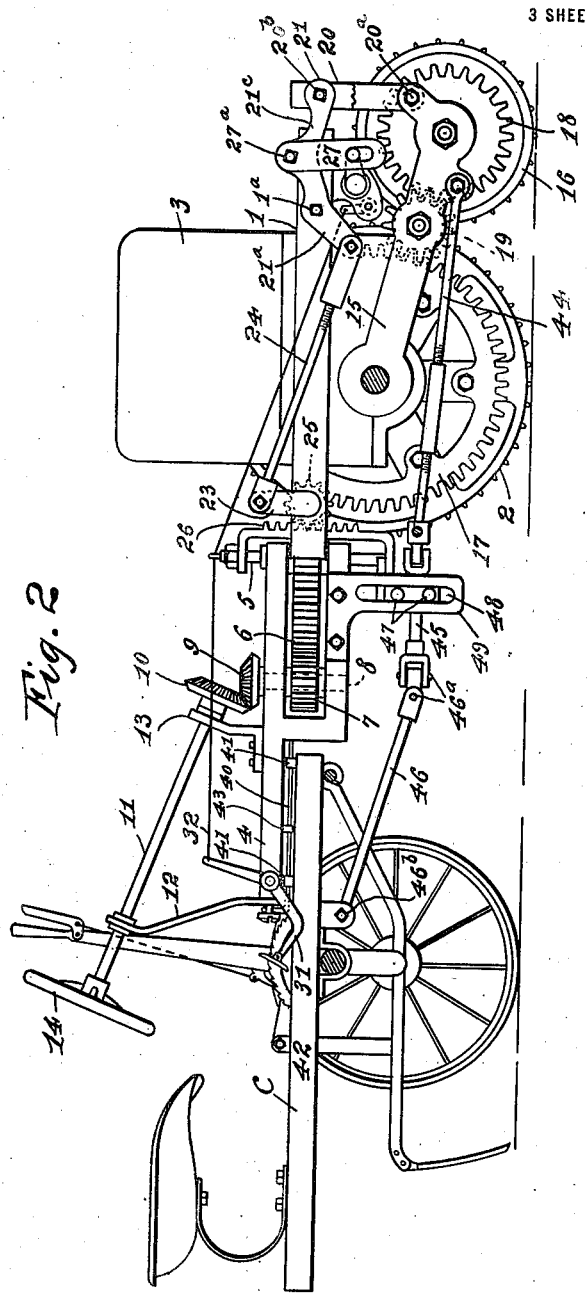

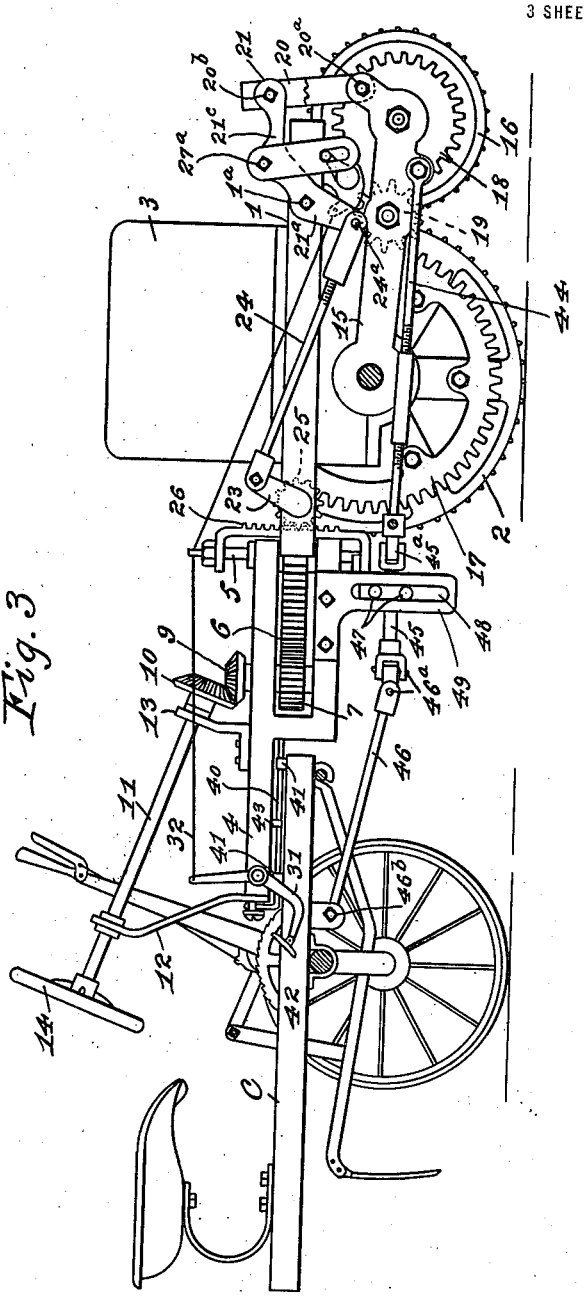

ALBERT D. RAY, OF CLEVELAND, OHIO.

TRACTOR.

1,416,753.

Specification of Letters Patent.   Patented May 23, 1922.

Application filed May 16, 1921. Serial No. 469,838.

*To all whom it may concern:*

Be it known that ALBERT D. RAY, a citizens of the United States, residing at Cleveland, in the county of Cuyahoga and State of Ohio, has invented certain new and useful Improvements in Tractors, of which the following is a specification.

This invention relates to tractor vehicles adapted to farm purposes in general, and particularly for the draft of accessory agricultural implements, and it may be considered as having reference to improvements on a tractor for which an application for Letters Patent of the United States was filed by me January 26th, 1920. Serial No. 353,969.

The present, like the former, has for its primary object the provision of a motor driven vehicle for draft purposes, that is compact, durable, economical, and efficient. With this in view, the invention provides a tractor that is adaptable to the draft of, and effective co-operation with any of the agricultural implements in common use. It provides a swiveled or oscillating connection that adapts the tractor and its consort to uneven ground conditions. It also provides an adjustable tread construction by which great traction power may be attained when the machine is employed for heavy work, such as deep plowing, and accommodating it to lighter top-soil work, such as cultivating, harrowing, seeding, or mowing, where less traction power is required. This adjustable feature also facilitates the steering of the tractor when it is desired to make short turns.

The above objects are all included in my former improvement and are pertinent to this invention. The present invention further provides a novel construction and arrangement whereby the hauling capacity and consequently the efficiency of the tractor is increased. This construction provides for utilizing the pull of the load by means of a draw-bar connection made forward of the main traction wheels and below the axis of said main traction wheels and the auxiliary wheels. This direct line draft being automatically maintained imparts a downward pull which will cause increased, or decreased friction between the tractor treads and the ground proportionate to the load, and thus will increase the efficiency of the tractor.

The present invention still further provides for the raising and lowering of the auxiliary traction wheels by motor power, instead of by manual means as set forth in my former application.

With these and other objects that will become apparent from the specification, the invention consists in the construction, combination and arrangement of elements as hereinafter described and pointed out definitely in the appended claims, reference being had to the accompanying drawings which are made part of the specification, similar characters of reference being employed to designate corresponding parts.

In the said drawings Fig. 1 is a plan view of the improved tractor.

Fig. 2 is a sectional elevation taken substantially on line $x$—$x$ of Fig. 1, showing the auxiliary wheels in their downward position, and Fig. 3 is a similar view showing the said wheels raised.

Preliminary to setting forth the present improvements, I will describe the general construction of the tractor, which, as before stated, is similar to a former invention of mine.

This construction provides a horizontal frame 1 which is adapted to carry the operating mechanism. Traction wheels 2 are mounted on said frame and driven by an engine and suitable transmission mechanism, said engine being supported by the frame within the casing 3. It is not deemed necessary to show the engine, as there are various types of internal combustion engines that are applicable to the present improved tractor.

A reach member 4 is connected with the frame 1 by a swivel pin or king-bolt 5, said member 4 being adapted to horizontal oscillation on said member 5. A segmental rack 6 is attached to the rear of the frame 1, said rack being in mesh with a spur gear 7. The rack and gear are housed in the member 4, as shown, said gear 7 being fixed on a stub-shaft 8 which carries a bevel gear 9, said gear 9 being in mesh with a companion gear 10 carried on a steering rod 11. The steering rod 11 is mounted in suitable brackets 12 and 13 which are attached to the reach member 4, and is provided with a hand-wheel 14. It will readily be seen that the tractor can be guided or turned to right, or left by the steering rod 11, through the co-action of the gears 10, 9, 7 and 6.

Rocker arms 15 are journaled on the axles that support the main traction wheels 2. These arms extend forward and are provided with bearings for auxiliary traction wheels 16. The wheels 16 are of less diameter than the wheels 2, and are in alignment with said wheels 2. The construction thus far described is embodied in my former tractor, and the driving connections of the traction wheels is the equivalent of that set forth. In place of the sprocket elements of the former construction, the present embodiment provides gears 17 attached to the main traction wheels 2 and co-operating with gears 18 attached to the wheels 16, through interposed gears 19 which are journaled on the inner rocker arms 15.

A yoke 20 is pivotally connected at 20$^a$ with the two inner rocker arms 15, and levers 21 fulcrumed on the frame 1 at 1$^a$, are pivotally connected with the yoke 20 at 20$^b$. A shaft 22 is journaled transversely in the frame 1, said shaft being provided with a crank arm 23 which is connected by a rod 24 with the arm 21$^a$ of one of the levers 19, as shown at 24$^a$. The shaft 22 carries a spur gear 25 which meshes with a vertically movable rack 26. Link bars 27 are pivotally connected with the lever arms 21$^c$ at 27$^a$. The links serve as auxiliary means for raising and lowering the traction wheels 16, through their co-action with mechanism which is actuated by the motor and controlled by the operator. The said mechanism includes a shaft 28 transversely mounted in the frame 1 and driven through the medium of a worm wheel 28$^a$ which co-acts with a worm 29, said worm 29 being operated by the motor. Clutch elements 30 carried on the shaft 28 are controlled by the operation of a foot-lever 31 and connecting cable 32, and are adapted to operatively connect the shaft 28 and the links 27, whereby a vertical movement is imparted to said links. This action is transmitted through the elements 21, 20, and 15, and their connection thereby causing an arcuate movement of the wheels 16 which are journaled in the arms 15. Any movement of the links 27 creates a corresponding movement to the rack 26, due to the connection of the lever arm 21$^a$ with the crank 23 by the rod 24, and the operation of the gear 25 with said rack.

A salient feature of the present invention is a novel construction and arrangement of implement draft means which cooperates with the convertible traction mechanism. This construction provides for automatically regulating the traction energy of the machine in accordance with the load.

The implement C is connected with the reach member 4 of the tractor by a coupling rod 40 which passes through eye members 41 on the implement reach 42 and through similar eyes 43 on the tractor reach. This provides a limited longitudinal relative movement between the tractor and the implement. Draft rods 44 are pivotally connected with the rocker arms 15 below the axes of the traction wheels and forward of the axles of the main traction wheels 2. The said draft rods 44 have a common connection with a draw-bar 45 at 45$^a$, and a connecting rod 46 having a duplex pivotal connection with the draw-bar 45 at 46$^a$, is connected with the implement at 46$^b$. The draw-bar is provided with a block having lateral guide elements 47 attached thereto, said guides extending into vertical slots 48 provided in brackets 49 which depend from the frame of the tractor. The construction just above described provides for substantially a straight line draft through a common center, and automatically forces the forward traction wheels deeper into the soil under increased load of the implement from which the direct draft is transmitted to the rocker traction frame. Thus increasing, or decreasing the traction proportionate to the load.

When the forward wheels are raised the draw-bar 45 is raised thus eliminating any binding from changing angles in the draft line, and maintaining the direct line draft.

It will be understood that various alterations and modifications in details of construction are possible without departure from the spirit of my invention, and that I am not therefore limited to the specific form as shown and described, only so far as governed by the scope of the appended claims.

Having thus described my invention, what I claim and desire to secure by Letters Patent is.

1. In a tractor, the combination of a supporting frame; a motor mounted on the frame; main traction wheels mounted on the frame and adapted to be driven by the motor, rocker arms journaled on the axis of the main traction wheels and extending radially therefrom; auxiliary traction wheels journaled in said rocker arms; compound lever mechanism connected with the frame and the rocker arms for vertically oscillating said rocker arms; and means for actuating said lever mechanism, said means being operated by the motor.

2. In a tractor in combination with an implement consort, means for automatically compensating the traction energy with the load of the consort, said means comprising longitudinally movable connection between the tractor and the consort, main traction wheels on the tractor, rocker arms journaled on the axis of the main traction wheels and extending radially therefrom, auxiliary traction wheels journaled in said rocker arms, and draw-bars connected with the consort, extending forward therefrom beneath the axis of the main traction wheels and attached to the rocker arms.

3. In a tractor adapted to the draft of implements, longitudinally movable connecting means between the tractor and the implement, main traction wheels, rocker arms journaled on the axis of the main traction wheels and extending radially therefrom, auxiliary traction wheels journaled in said rocker arms, a motor for driving the traction wheels, compound lever mechanism for vertically oscillating said rocker arms, motor driven means for actuating said lever mechanism, clutch mechanism for controlling said means, a draw-bar mounted in a bracket attached to the tractor frame and adapted to move vertically in said bracket, a draft rod connected with the implement and having a universal connection with the draw-bar, draft rods connected with the draw-bar, extending forward beneath the axis of the main traction wheels and attached to the rocker arms, means for raising and lowering the draw-bar, said means co-acting with the lever mechanism for oscillating the rocker arms.

In testimony whereof I affix my signature.

ALBERT D. RAY.